United States Patent Office 3,301,701
Patented Jan. 31, 1967

3,301,701
NONREFLECTIVE GLASS COATINGS
Chester L. Baker, Narberth, and John Frankle Austin, Philadelphia, Pa., assignors to Philadelphia Quartz Company, Philadelphia, Pa., a corporation of Pennsylvania
No Drawing. Filed June 25, 1965, Ser. No. 467,086
5 Claims. (Cl. 117—118)

This application is a continuation-in-part of our copending application Serial No. 768,823, filed on October 20, 1958, now Patent 3,208,823, which in turn is a continuation-in-part of application Serial No. 292,936, filed on June 11, 1952 and now abandoned, and application Serial No. 763,444, filed on July 24, 1947 and now abandoned.

INTRODUCTION

This invention relates to the deposition of micro fine silica and metallic silicates on surfaces reactive with sodium silicate, and it particularly relates to the precipitation of micro fine silica and metallic silicates from a protocoacervate of a soluble silicate to form a coating integral with the surface.

THE PRESENT STATE OF THE ART

There are many references in the literature to the coating of various surfaces with silica and metallic silicates and such coatings have many industrial applications. In a large number of these cases the emphasis is on the development of an evenly dispersed coating of particles of silica or silicate adsorbed on the surface. We have now found that by forming a protocoacervate solution or sol of a soluble silicate, as described in our copending application Ser. No. 768,823, now Patent 3,208,823 and in our U.S. Patents Nos. 2,948,701, 2,958,-578 and 2,972,594, we may coat surfaces with hydrogen and heavy metal silicates in a uniform integral layer of microfine silica and metallic silicate particles. Micro fine particles are those which have an ultimate particle size or effective diameter of 1 micron or less.

THE INVENTION

Our invention comprises a process, and the product thereof, of forming a surface integrally coated with a hydrogen or heavy metal silicate, frequently containing metal oxide mixed therein, in finely divided form; said process comprising mixing an aqueous solution of a soluble silicate having a molecular ratio of from about 2:1 to 1:4, and a concentration of silica ranging from about 1 to 30% by weight; with a coacervating agent in quantity and under conditions tending to produce a state of incipient coacervation, that is a protocoacervate, the latter state being indicated by the first appearance of a faint opalescence in the mixture, coacervation being prevented either by adding the coacervating agent in an amount insufficient to produce coacervation or by stopping the coacervating action before the appearance of any more than a faint opalescence in the mixture, bringing said protocoacervate into intimate contact with a surface capable of forming an insoluble silicate or silica and recovering the surface with a siliceous coating; the reactive surface being treated with the silicate no eariler than the coacervating agent is mixed therewith and under conditions maintaining the environmental conditions substantially uniform during the formation of the precipitate.

The invention, therefore, relates to a novel method of forming finely divided particles of metal silicates and/ or silica and metal oxide particles on surfaces reactive with soluble silicate, the particle size or effective diameter of these precipitated coatings ranging from a few microns down to about 7 millimicrons. The method is generally applicable to a wide range of solid extensive surfaces which are capable of forming silica and metal silicates insoluble in aqueous solution. The method usually produces amorphous particles, the bulk of which are spherical, and which are characterized by their unusual softness, and in some cases crystalline particles may be produced but, because of the direct reaction with the reactive surface, the particles are an integral part of the surface being bound by chemical bonds. Because of the fine particle sizes in the solution, these integral coatings are more complete, thinner, denser, and more tightly bound than previously described siliceous coatings.

In this method, a soluble silicate solution having a concentration of silica ranging from about 1 to 30% by weight and having a molecular ratio of metal oxide to silica within the range of from about 2:1 to 1:4 is mixed with a coacervating agent which is capable of producing coacervation of the silicate solution when added thereto in sufficient proportions. The higher concentrations of silica are employed with the higher ratios of alkali metal oxide to silica. In the case of sodium silicate, for instance, the weight percent ratio of $Na_2O$ to $SiO_2$ will be within the range of about 2:1 to 1:4. For the production of particle sizes below about 20 millimicrons in diameter, the concentration of $SiO_2$ on the final mixture should be within the range of from about 0.5-8% by weight, and the ratio of the $Na_2O$ to $SiO_2$ of the sodium silicate solution, for example, should be within the range of from about 1:2.4 to 1:4. The quantity of coacervating agent added is usually below that required to produce full coacervation of the solution and at a maximum is usually only sufficient to form what we have called a protocoacervate i.e. a solution in state of incipient coacervation. If an excess above this maximum is added, it is necessary by means of a special mixing technique to stop reaction of the coacervating agent as described below before its full effect has been realized. The state of incipient coacervation is indicated by the appearance of the first faint opalescence in solution, i.e. by the appearance of particles visible in the dark field microscope. For the production of the finest particles, this state should not be exceeded before contact with the reactive surface whose usual effect is to stop the coacervating action by insolubilizing the micelles present.

REACTIVE SURFACES

Reactive surfaces which may be used to precipitate hydrogen and heavy metal silicates are readily recognized. It is well known that ferric oxide or other iron oxide will react to precipitate iron silicates. Similarly, calcium on a calcium sulfate surface will produce a layer of calcium silicate. Clays with exchangeable metal or hydrogen ions may also serve to bring about the precipitation of siliceous particles on the surface of the clay. For instance, a calcium montmorillonite or a kaoline treated with acid can be coated with calcium silicate in the first case and silica in the latter. One of the interesting applications is the use of an acid-treated to form surface films of silica which prevent undesired reflections. These films may be built up to any desired thickness. In general, these reactive surfaces are capable of forming insoluble silicates by the replacement of alkali from the protocoacervated alkali silicate with hydrogen or non-alkali metals in the groups of the Periodic Table from I–B to VIII. In general, the insoluble surface layer may be any compound of a metal capable of forming an insoluble silicate.

At least twenty-five metals are known whose ions are capable of precipitating insoluble silicates from aqueous solution and any compound of these is operative is more soluble in water than the corresponding metal silicate.

Among the various possible insolubilizing agents which can be used to form the reactive extensive surface of a solid, we consider the alkaline earth metal oxides and hydroxides, such as the oxides and hydroxides of calcium, magnesium, barium, and strontium, to be particularly effective. Other insolubilizing agents advantageous in our process include oxides, hydroxides and salts of metals in Groups I–B to VIII of the Periodic Table which have a solubility of at least $1 \times 10^{-5}$ g. in 100 g. of water, such as $Al_2O_3$, $Fe_2O_3$, HgO, SnO, ZnO, CoO, NiO, $As_2O_3$, and their salts such as $FeSO_4$, $Al_2(SO_4)_3$, $K_2TiF_6$, and $NaAlO_2ZnCl_2$, $CuCl_2$, and $Ti_2(SO_4)_3$. It is also possible to employ salts of amphoteric metals wherein the metal atoms occur in the anions whereby the resultant coating consists of metal silicates. The insolubilizing agent on the surface may also consist of a mineral or organic acid, acid anhydride or acid salt, or mixtures thereof whose cations form insoluble silicates; in fact any acid or acid materials stronger than silicic acid can be used. Thus the surface may be treated or formed with $H_3PO_4$, HCl, $H_2SO_4$, $HNO_3$, $CO_2$, $SO_2$, $Cl_2$, $P_2O_5$, ammonium carbonate, ammonium chloride, ammonium nitrate, $NaHCO_3$, $NaHSO_4$, $KHSO_4$ and organic acid such as acetic, oxalic, tartaric, citric, formic, fumaric, etc.

Salts of organic cations such as basic dyes and quaternary ammonium compounds may be used by applying them to the reactive surface.

When the reactive surface is acidic, the surface layer is very fine, pure silica of very uniform particle size. These particles are usually amorphous, the bulk being spherical and characterized by their unexpected softness. After drying at 100° C. they have the following physical properties:

Refractive index _____ 1.42 to 1.44.
Particle size (mμ) _____ 7–100.
Hardness (gms. zinc/gm. $SiO_2$/min.) __ about 0.02.
Absorptivity:
    Petroleum ether (gms./gm.) _____ 5.5.
    Kerosene (gms./gm.) _____ 3.1.
Thermal conductivity (cal./sec.-cm.
    ° C.) _____ approx. $1 \times 10^{-5}$.
$SiO_2$ content (anhydrous) _____ 99.5% or over.

The value for the hardness listed in the above table was determined by rubbing 0.1 gram of the $SiO_2$ product between two zinc plates for one minute and determining the weight of the zinc removed from the plates by attrition per gm of $SiO_2$ employed. The particle size is determined by measuring electron micrographs.

Our preferred silica may also be described as finely divided, precipitated silica capable of producing vulcanized rubber products having a modulus of at least 1300 p.s.i. at 300% extension and a tensile strength above 3000 p.s.i. when incorporated in an amount of 42.6 parts in 100 parts of natural rubber, 5 parts of ZnO, 3 parts sulfur, an optimum Santocure level between 0.75 and 4.5 and 3 parts of stearic acid and vulcanized at 287° said silica having a particle size within the range of 10 mμ, a pH within the range of 4.5–10, an $SiO_2$ content greater than 95% on an anhydrous basis, a % 325 mesh wet sieve residue, an HF residue less 4%, and an ignited loss of between about 5 and 15%.

COACERVATING OR CLUSTERING AGENTS

Some coacervating agents act rapidly and some slowly. With rapid coacervating agents it is usually more convenient to add less than that required to produce the first appearance of opalescence, while with slow acting coacervating agents it may be more feasible to use an excess of the coacervating agent while treating the reactive surface either simultaneously therewith or immediately thereafter with rapid agitation. It is essential, of course, that the coacervating agent be mixed with the silicate solution no later than contact with the insolubilizing surface is made herewith.

The coacervating agent must be a hydrophilic material which is water-soluble or miscible with water and which is capable of reducing the effective charge on the colloidal silica particle (micelles) present in the silicate solution and capable of desolvating these particles and/or reducing the effect of dielectric constant of the medium between the particles. This material need not be an electrolyte since water-soluble or water-miscible organic solvents in general are capable of serving as coacervating agents, but it must be an agent capable of coacervating soluble silicate solutions when added thereto in sufficient quantity. The coacervating agent should not form a precipitate with water, or at least it should not form a precipitate with water which is less soluble than the final precipitate produced in the process. The coacervating agent, moreover, should preferably be compatible with the reactive surface and any reaction products formed by the reaction with the surface should be more soluble than the surface coating precipitated.

Among the coacervating agents which have been successfully used in our process there may be mentioned methyl and ethyl alcohols, acetone, ethyleneglycol, monoethanolamine, the ethyl ether of ethyleneglycol, formaldehyde, monomonovalent electrolytes, such as NaCl, $NH_4OH$, $NH_4Cl$, KCl, and $NaNO_2$, and the more highly soluble mono-divalent electrolytes, such as $Na_2SO_4$ and sodium tartrate. Among the various possible coacervating agents which can be employed in our process we consider NaCl, $Na_2SO_4$, methyl alcohol, acetone, ammonia gas and $NH_4OH$ to be somewhat preferable to other coacervating agents for economic reasons. It should be noted, also, that mixtures of the coacervating agents may be used. For instance, natural brines and mixtures of monomonovalent salts. Other preferred organic coacervating agents are the simple alcohols including isopropanol and ethanol, saturated cyclic ethers such as dioxane and tetrahydrofurane, and the ethyl and methyl ethers of ethyleneglycol.

CONDITIONS OF REACTION

In all the mixing and treating techniques, the formation of the ultimate particles occurs while the environmental conditions of concentration, temperature, pH and the like are maintained substantially constant so that there is essentially an equilibrium reaction. This is important in obtaining products of the finest particle sizes. While, in most cases, the invention is directed toward the production of very fine particles on the activated surface, in some cases it is desirable to have larger particles which are more gelatinous in character as these act as absorbents to a greater degree whereas the finer particle sizes ordinarily produced by our procedures are denser at the lower surface area and in general are non-gelatinous in character. The proportion of gel can be increased, for instance, by adding a somewhat excessive amount of coacervating agent. In general, a boiling step is not required to reduce the gel content of our products since the gel formation is avoided initially.

It may be noted, too, that mixtures of soluble silicates such as mixtures of sodium and potassium silicates may be used if there is any advantage therefrom. In addition, it may be advantageous at times to have present another hydrophilic colloid thus forming a mixed surface layer, such as a mixture of silicate with starch, gelatin, gum arabic or rubber latex, etc. The hydrophilic colloid solution must, of course, be compatible.

The temperatures used in our process are not critical since any ordinary atmospheric temperatures can be employed with proper regulation of the other variables. Concentrations of the silicate solution and coacervating agent are critical for the formation of the finest particle sizes, as described above. Unfortunately, it is impossible to set out specific ranges of concentrations which will apply to all silicate solutions and all coacervating agents, but with the aid of the simple tests and specific examples it is believed that those skilled in the art will have no difficulties in adopting our process to any silicate solution and any coacervating agent and any reactive insolubilizing surface.

PROPOSED THEORETICAL EXPLANATION

In our above-mentioned co-pending application and its predecessors we have described the production of finely divided silica and finely divided metallic silicates, respectively, by precipitation from colloidal solutions of soluble silicates such as sodium silicate, and relevant material in the application and its predecessors is part of this application. In such solutions the silica is brought into the solution and dispersed through the use of alkali and water thus forming a dispersion or colloidal solution of silica micelles which are maintained dispersed by the absorption of sodium ions. When these sodium ions are removed from the silica and, for instance, replaced by hydrogen ions, or heavy metal ions, the silica separates out in a different form from that which it had initially.

The preparation of a finely divided silica by our process is not simply explained according to present theories of physical and colloidal chemistry. It involves:

(1) The structure of water;
(2) The character of sodium silicate solution in water;
(3) The effect on the silicate solution of adding coacervating agents such as sodium chloride, ammonium hydroxide and alcohol, and
(4) The effect of adding acid or soluble heavy metal ions.

Chemical reactions now seem best explained fundamentally by qualitative use of quantum theory and considering the relative atomic sizes, charges and electron fields.

According to this concept, water is written as $$O^{6+}H^+H^+(E^-8)$$

This corresponds to an oxygen ion with two protons ($H^+$) and eight electrons in its electron cloud. The water molecule tries to increase its screening or charge neutrality by sharing anions and to do this it tends to polymerize in groups of two or three so that the oxygen is screened by four tetrahedrally placed hydrogen ions somewhat similar to the silica tetrahedron.

In water solutions, sodium silicate is made up of ions of sodium and silicon. The sodium ($Na^+$) ions are stable if they are screened by 6 to 8 water molecules or polymerized water molecules. $Si^4$ on the other hand has a much stronger field and is not easily sufficiently screened even by $OH^-$ ions. In aqueous solution, it has a co-ordination number of 6 but even 6 of the $OH^-$ ions are insufficient to prevent polymerization by the formation of hydrogen bonds. The presence of the sodium ions stabilizes the system at a point depending on the ratio of $Na_2O$ to $SiO_2$ and the solution resulting is a conglomerate of free sodium ions and more or less aggregated silicon atoms. The silicon $Si^{4+}$ aggregates are known as micelles. They may be described as 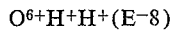. These may have molecular weights in the thousands as the ratio of $SiO_2$ to $Na_2O$ approaches 3 or 4. Some sodium is absorbed and some trapped in the micelles. Sodium may be trapped in between the chains of silicon atoms by cross linking between the chains. This cross linking usually is a condensation of $OH^-$ groups forming Si—O—Si bonds.

If the pH is reduced, less hydroxyl ions are available for screening the silica and it attempts to complete its screening by further polymerization and cross linking or condensation until a continuous gel is formed throughout the system.

The phenomenon of coacervation which our invention employs is described in thermodynamic terms by Langmuir who, in an article published in J. of Chem. Phys., 6, 873–896 (1938), presents a mathematical formula showing that coacervation occurs when, in a sufficiently dilute solute solution of highly charged plate-like particles, the osmotic pressure reaches a value of $8.9 \times 10^7/B^2$ dynes/cm.$^2$. This coacervation constant is related to the dielectric constant of the solvent, the charge on an electron, etc. B is the distance in centimeters between the platelets. The constant represents a repulsive force which is independent of the charge but does depend on the concentration of the univalent ions. Polyvalent ions decrease the force.

The theoretical expression used by Langmuir, when osmotic pressure is plotted against concentration of colloid, has an S-shaped curve like that of the gas laws in the critical region, which indicates that coacervation is a critical phenomenon. In the critical region a maximum of osmotic pressure occurs and in our new process it is evidently necessary to bring the solution to a point just short of this maximum point by adding, for example, NaCl. The addition of insolubilizing agent then increases the osmotic pressure and ionic strength and decreases the field of force as a consequence of which precipitation occurs.

In this article, Langmuir has a table showing the correlation of the concentrations producing coacervation for various materials and with the calculated concentrations.

It seems probable, in view of Langmuir's findings, that the protocoacervate produced in our new process is a dispersion of micelles which are kept separated by ordinary thermal agitation but tend very strongly to form the tactoid groups which Langmuir defines as having the characteristics of a solid material, "often having such low mechanical strength that it appears to flow like a liquid." It appears likely that, when the insolubilizing agent is added to the protocoacervate, this agent reacts with the micelles to produce an insoluble precipitate the particles of which, on account of the speed of the insolubilizing reaction, retain to at least some extent the structure of the original micelles, very little agglomeration taking place. A precipitate is produced in this manner which, surprisingly, is totally different from that which would be produced if the insolubilizing agent should be added directly to the solution without any prior addition of coacervating agent.

Verwey and Overbeek in their book the "Theory of the Stability of Lyophobic Colloids," New York, Elsevier Publishing Co., 1948, have also discussed the principles of coacervation at some length. For the region of very small particles they are in substantial agreement with Langmuir, although there are some basic differences in their theoretical approaches. This treatment permits the setting up an equation which demonstrates the critical nature of the onset of coacervation. It is similar to the condensation of a gas at its critical point as described in texts on physical chemistry.

To understand what happens on a kinetic basis we turn again to the kinetic theory outlined above and explained by Weyl and Marboe in their recent book, "The Constitution of Glasses." If, in the alkaline solution of sodium silicate, a coacervating agent is added prior to lowering the pH, the course of the action is changed. For instance, sodium chloride may be added as the coacervating agent. Sodium ions have only a weak field and can be screened satisfactorily by water in its polymerized state. The chloride ion is described as $Cl^{7+}(E^{2-}_4)$ and as such it is more polarizable (the electron cloud may be more distorted) and therefore a more powerful screening agent for $Si^{4+}$ than is $OH^-$. The chloride ion also tends to make the screened aggregate unreactive at its surface. We thus have aggregates of silica which can come close together without further reaction between hydroxyl groups. The increased concentration of sodium ions reduces the available water. This seems to be the basis for coacervation wherein the less aqueous phase of silicon groups (polymerized, partially hydrated and containing some sodium ions) is made unreactive and separated as a viscous liquid from the remaining water which has a higher proportion of sodium and chloride ions. As Langmuir has shown, this separation occurs simultaneously as a critical phenomenon throughout the solution so that numerous minute particles of the viscous sodium silicate solution are separated. If given time, these will gradually combine and form a single coacervated layer. They still have the colloidal particles of silica protected by the chloride ions and the flow properties of this thick, homogeneous layer are different from those of ordinary sodium silicate.

Similarly, the action of ammonium hydroxide or alcohol may be explained. The end results are the same but the coacervation is weaker and slower and better control may be established with ammonium hydroxide than in the case of the chloride ion.

If, then, gelation is allowed to proceed by reducing the pH at just the point where the cloud of fine particles of sodium silicate coacervate separates and there is a critical phenomenon in the sense of physical chemistry, we have found it is possible to form very fine particles of dense silica which is screened and protected at its surface by the ions previously available from the coacervating agent, and the final particles may be separated essentially as they precipitate. The function of the insolubilizing agent is to replace the protective sodium ions. The coacervated somewhat destabilized colloid particle may be completely destabilized by the addition of an insolubilizing agent which may be hydrogen ions or ions of heavy metals which have bonds available for reaction with the silica. We have now taken advantage of this phenomena to use the coacervation process described for the preparation of new or improved silica and silicate coatings on various surfaces. It is only necessary to prepare a solid surface so that the protons or heavy metal ions are available with valences which can be used to completely destabilize the silica as a coacervated particle. This coacervated particle is distributed uniformly over the surface at the active sites and forms a very uniform coating of pure silica or metallic silicate, as the case may be. The surface is uniform in constitution as well as in particle size structure. The following examples demonstrate means by which active surfaces may be used or provided to produce these coatings.

*Examples*

We first describe a glass surface activated with acid which forms a non-reflective coating by reaction with a coacervated silica. If it is desirable to include zinc in this coating which may act as a flux when the coated article is heated to temperatures of 300 to 700 °C., the glass surface may be treated with a strongly acid solution of zinc acetate, for instance, or a small proportion of zinc acetate insufficient to cause the separation of the coacervated silica may be included in the coacervate before treating the activated glass surface.

*Example 1*

When a light wave strikes a glass surface some of the light is reflected and some of it is transmitted. The amount of reflected light can be reduced by forming a film upon the surface of the glass since then some of the reflected light changes phase and becomes invisible. The amount of reduction of reflection is dependent upon the index of refraction of the material comprising the film and the thickness of the film. Commercial coated glass surfaces have been prepared with calcium fluoride having a refractive index of 1.43 and in U.S.P. 2,417,147 it is disclosed that a similar film may be made with $SiO_2$ by reaction of silicon tetrachloride with water. Sixteen dips of a clean glass surface into a solution of silicon tetrachloride and acetone were required to produce a purple discoloration which was permanent to boiling water, intensive polishing and hot acids.

Similar films were prepared using our clustering process. Glass slides known as "Special non-corrosive microslides" Arthur W. Thomas No. 7030 were used. These are about one inch by three inches and made of hard glass having a thickness about 1.23 mm. We found that if these slides were cleaned with the ordinary cleaning solution made up from chromic acid and sulfuric acid, the surface appeared to be coated with chromic sulfate or some similar film which could be dipped into a dilute silicate solution without the clustering agent to form a sticky, purple film which dissolved on boiling in water. We assume there was some chromic silicate formed rather than a precipitated silica.

However, when fresh slides were cleaned and prepared by boiling in hydrochloric acid for 48 hours, washed and dried, the surface was quite reactive in a protocoacervate (or silicate solution triggered with ammonia solution). We made the following tests.

(1) The treated slide was dipped in dilute 25% standard silicate solution for 72 hours and then washed and dried. There was no change in the slide and no film formed.

(2) When a similar slide was allowed to dip into a solution of 50 ml. of 25% standard silicate solution treated with 30 ml. of 28% $NH_3$ solution [or about 5% $SiO_2$ and 9.3% $NH_3$ (185 parts of $NH_3$ to 100 parts of $SiO_2$) to form a faint opalesence] for 72 hours and then washed and dried, a faint and complete film had formed.

(3) Similarly, a faint and complete film formed when a slide was dipped for 72 hours in a protocoacervate formed with methyl alcohol or sodium chloride. None of these films were removed by boiling water.

It is believed that the alkali was removed from the glass surface by base exchange in the hydrochloric acid solution. It would likewise be possible to remove the sodium or calcium from the surface of clay.

In a similar series of tests, the slides were boiled in concentrated hydrochloric acid for only 15 hours. The boiled slide appeared to have a slight film formation on the surface which would be presumed to be leached free of alkali. The slide was then allowed to soak for 72 hours in the same filtered protocoacervate solution. It was then found that the surface was evenly coated with a grayish purple film which was not removed by allowing the slide to stand in boiling water for 6 hours. This film was similar to that formed by the silicon tetrachloride mentioned above.

Fresh glass microscope slides were cleaned by washing thoroughly and rinsing and then were boiled with concentrated hydrochloric acid for 72 hours. The slides were thoroughly rinsed with distilled water following this boiling and were then dried with lens paper. They were immediately immersed in a solution formed by reacting at a temperature of 25° C. 430 ml. of 28% $NH_3$ solution and 600 ml. of 20% "E" silicate solution or 3.3% $SiO_2$ and 10.5% $NH_3$ (320 parts of $NH_3$ to 100 parts $SiO_2$). The mixture was opalescent and was filtered before use.

One slide was dipped into the protocoacervate solution for one minute, drained and air-dried for an hour. The second was dipped initially as had been the first for one minute and was then oven-dried at 50° C. for 15 minutes. It was re-dipped for one minute, and again dried in the oven.

Each slide was washed with soap and water and immersed in boiling water for a period of one hour to establish the strength of the film.

Even after this treatment both slides showed a definite film, the second being more cloudy than the first. It was evident that the reflection was considerably reduced from these glass surfaces.

It is not necessary to boil the glass slide in such concentrated acid for such a period. Actually, to produce a glass surface with a pH of 2.9 is preferable since the surface has more active ions available for reaction with the silica in the protocoacervate.

Example 2

1000 lbs. of a solution of sodium silicate containing 8.6% $SiO_2$ and a weight ratio of 3.2 $SiO_2$ to 1 $Na_2O$ was rapidly mixed with 510 lbs. of 28% ammonia solution. This formed a protocoacervate which was used to coat granules of gypsum with a layer of calcium silicate by merely filtering the protocoacervate through a bed of the gypsum. The recovered gypsum, after being dried, was found to have a slower reaction rate and a reduced tendency to flake.

Example 3

The same protocoacervate formed in Example 2 was used to treat surfaces of sodium aluminum silicate, a base exchange zeolite having the approximate composition $Na_2O:Al_2O_3:5SiO_2$ in which the $Na_2O$ had been exchanged for CaO. After treatment with the protocoacervate, the particles were found to have a surface layer of absorbent calcium silicate.

When washed and dried, this product was found to have enhanced value as an extender for pigments and colors.

Example 4

When the protocoacervate of Example 1 was used to treat particles of calcium carbonate, a period of several hours was required in which the calcium slowly reacted and formed a layer of calcium silicate on the surfaces of the calcium carbonate particles. If the protocoacervate is formed with methyl alcohol, instead of with ammonia, the reaction to form calcium silicate on the surface is much more rapid.

Example 5

Particles of titania were treated with sulfuric acid forming a surface layer of titanium sulfate or, alternatively, a surface layer of $K_2TiF_6$ was formed. When these particles were treated with the protocoacervate of Example 2, they were found to be coated with very fine particles containing silica which we consider to be titanium silicate.

Recapitulation

The process of this invention covers the manufacture of siliceous surface coatings wherein an aqueous solution of a soluble silicate is contacted with an agent capable of clustering aqueous soluble silicate solutions and a reactive surface having an agent capable of insolubilizing a soluble silicate comprising hydrogen and a heavy metal from the groups of the Periodic Table I to VIII, inclusive, and so combined that (a) the quantity of the clustering agent is within the range of 20 to 500% of the amount required when slowly added to the silicate solution to produce the first appearance of a faint opalescence in the mixture but of sufficient quantity to avoid the formation of a gel, (b) the environmental conditions are maintained substantially uniform while the finely divided siliceous products are in a process of formation on the surface by mixing said clustering agent with said soluble silicate solution not later than said reactive surface is contacted therewith, and (c) reaction with the reactive surface is continued for a period required to complete the required surface thickness and the surface coated product thereby produced is recovered.

Our new process is especially valuable in giving control of structural characteristics of the surface coating which makes it especially useful for providing a coating of very fine, hydrated silica or metallic silicate particles on fibers and other surfaces. For instance, by special techniques, this fine silica is applied to a glass surface and the surface is rendered non-reflective. This is much more economical than processes relying on a high-temperature vacuum process or difficult leaching steps.

Many similar products can be produced by this process. Useful coatings may be applied in this way to roofing granules, abrasives, various mineral and metallic powders, including clays and magnetic iron, lead titanate, and to organic films. For instance, a paper film treated with a reactive mineral containing calcium or with acid, can be prepared having a layer of silica on the surface which will tend to resist slippage or will resist soiling. Also, a layer of such fine absorbent silica on paper used as a filter for a cigarette will remove the undesirable resinous constituents of tobacco smoke much more effectively than the paper alone. Silica surfaces applied to nylon, likewise, have advantages in preventing slippage, increasing the absorbency for moisture, and in aiding in the development of permanent colors.

While we have described what we consider to be the more advantageous embodiments of our process, it is evident of course that various modifications can be made in the specific procedures which have been described without departing from the purview of this invention. It is believed to be obvious from the above description that any of the clustering (i.e. coacervating) agents which are known to be capable of clustering alkali metal silicate solutions can be used in our process and that any acidic or metallic surface which is capable of precipitating substantially pure silica or metallic silicate from a mixture of silicate and clustering agent can be used as the reactive surface. It is not even necessary that the clustering agent be strictly compatible with the reaction surface but only that any precipitate formed by the contact of these two agents be more soluble than the precipitate formed upon mixing the silicate solution with the reactive surface. It is possible to employ a mixture of clustering agents to produce the desired opalescent solution. It is also possible to employ a mixture of different reactive materials on the reactive surface. When mixtures of the reagents are employed, these agents should be compatible at least to the extent that no precipitate is formed upon mixing them which is less soluble than the finely divided silica or silicate product. The temperatures used in our process are not critical since any reasonable temperature (e.g. 1–100° C.) can be employed with proper regulation of the other variables. However, we prefer the range of about 10° to 40° C. as being convenient and economical. Concentrations of silicate solution and clustering agent are critical for the formation of the finest particle sizes which generally serve to produce thin, dense, tightly bound integral coatings as described previously. Unfortunately, it is impossible to set out specific ranges of concentrations which will apply to all silicate solutions, all clustering agents, and all insolubilizing agents. With the aid of the simple tests and the specific examples given in this application and in the prior applications mentioned above, it is believed that those skilled in the art will have no difficulties in adopting our process to any silicate solution, any coacervating agent and any insolubilizing surface which it is desired to employ in the process. It is possible, of course, to employ any of the soluble alkali metal silicates, such as potassium, cesium and lithium silicates, as a substitute for the sodium silicate solutions used in our process, although this is more of an academic than practical interest owing to the higher cost of the other alkali metal silicates. Further modifications of our process which fall within the scope of the following claims will be immediately evident to those skilled in the art.

Related patent applications

In the two earlier prior applications we describe methods of obtaining finely divided solids by treating various inorganic colloidal solutions, such as solutions of sodium silicate with coacervating agents and insolubilizing agents, and in application Ser. No. 768,823, we define more specifically and in greater detail the critical conditions required to produce a finely divided silica as well as procedures for coating solid surfaces. It is believed and intended that all of the disclosures of the above applications are either specifically included or incorporated by reference in the present application.

What is claimed is:

1. A non-reflective glass surface comprising a glass base coated with a finely divided silica substantially free from silica gel characterized by having a substantially uniform particle size and shape, amorphous, the bulk being spherical, and after washing with distilled water and drying at 100° C., having the following properties:

Particle size (average) (m$\mu$) ------- 7–100.
Refractive index ----------------- 1.42 to 1.46.
Hardness (gms. zinc/gm. $SiO_2$/min.) _ about 0.02.
Absorptivity:
    Linseed oil (gms./gm.) ------- 1.0–2.3.
    Petroleum ether (gms./gm.) --- 5.5.
    Kerosene (gms./gm.) --------- 3.1.
Thermal conductivity (cal./sec.-cm.° C.) ---------------------------- Approx. $1 \times 10^{-5}$.
$SiO_2$ content (anhydrous) percent __ at least 99.5.
Gel content percent -------------- less than 0.1.
Area (m.²/gm.) ------------------- 25–400.

2. A process for the manufacture of surfaces coated with finely divided silica which comprises mixing an aqueous solution of sodium silicate having a weight ratio of $Na_2O$ to $SiO_2$ within the range of from about 1:2.4 to 1:4 and a concentration of $SiO_2$ ranging from about 1 to 30% by weight with ammonia in an amount ranging from about 80 to 500% of the quantity required when slowly added to the silicate solution, to produce the first appearance of coacervation in the mixture; the higher concentrations of silica being employed with the lower ratios of $Na_2O$ to $SiO_2$; contacting as an insolubilizing agent a surface having an acidic pH; the quantity of $NH_3$ added varying from about 0.8 to 4 parts by weight to 1 part of $SiO_2$ in the silicate solution; conducting the precipitation on the surface in such manner that the required film thickness is developed and so the ammonia is completely mixed in not later than the reaction with the acidified surface, the concentration of the solution being so chosen that the total $SiO_2$ content in the final mixture is within the range of from 0.5 to 8% by weight and recovering the resulting surface coated with finely divided silica free from silica gel.

3. In a process for the manufacture of surfaces with finely divided siliceous coatings wherein an aqueous solution of a sodium silicate is contacted with an agent capable of clustering aqueous sodium silicate solutions and an insolubilizing agent on the surface capable of precipitating siliceous components from the mixture, the improvement which comprises:

(a) the quantity of the clustering agent being within the range of 20–300% of the amount required when slowly added to the silicate solution to produce the first appearance of a faint opalescence in the mixture, but of sufficient quantity to avoid the formation of a gel;

(b) maintaining the environmental conditions substantially uniform in the above mixture while the finely divided silica products are in formation by;

(c) mixing said clustering agent with said sodium silicate solution not later than the activated surface is treated therewith and (d) recovering the coated surface thereby produced.

4. In the manufacture of siliceous coated surfaces the process which comprises mixing an aqueous solution of sodium silicate having a weight percent ratio of $Na_2O$ to $Si_2O$ within the range of from about 2:1 to 1:4 and a concentration of $SiO_2$ range of from about 1 to 30% by weight, with a coacervating agent which is capable of coacervating the silicate solution and which is selected from the class consisting of methyl and ethyl ether of ethylene glycol, isopropanol, formaldehyde, ammonia, $NH_4OH$, $NaCl$, $KCl$, $NaNO_3$, $Na_2SO_4$ and sodium tartrate; the quantity of coacervating agent employed being from about 20 to 500% of the amount required when slowly added to the silicate solution to produce the first appearance of coacervation in the mixture; the higher concentrations of $SiO_2$ being employed with the lower ratios of $Na_2O$ to $SiO_2$; contacting therewith as an insolubilizing agent a surface capable of precipitating silica from the mixture; maintaining the environmental conditions substantially uniform in the mixture while the siliceous particles are in process of formation by mixing the coacervating agent with the silicate not later than the reactive surfaces are contacted therewith and by continuing the contact with the reactive surface for a time sufficient to form the required coating and recovering the surface coated solid thereby produced.

5. A non-reflective glass surface comprising a glass base coated with a finely divided silica, substantially free from silica gel, capable of producing vulcanized rubber products having a modulus of at least 1300 p.s.i. at 300% extension and a tensile strength above 3700 p.s.i. when incorporated in an amount of 42.6 parts with 100 parts of natural rubber, 5 parts of zinc oxide, 3 parts of sulfur, an optimum Santocure level between 0.75 and 4.5 parts, and 3 parts of stearic acid, and vulcanized at 287° F., said silica having a particle size within the range of 10 to 20 m$\mu$, a pH within the range of 4.5–10, an $SiO_2$ content greater than 95% on an anhydrous basis, a 0.00% 325 mesh wet sieve residue, an HF residue less than 4%, and an ignited loss of between about 5 and 15%.

References Cited by the Examiner

UNITED STATES PATENTS

| | | | |
|---|---|---|---|
| 2,661,438 | 12/1953 | Shand | 117—124 |
| 2,725,320 | 11/1955 | Atkeson et al. | 117—124 |
| 2,740,726 | 4/1956 | Anderson | 117—124 |
| 2,926,390 | 3/1960 | Talalay et al. | 117—169 |
| 3,009,827 | 11/1961 | Devel et al. | 117—118 |
| 3,013,897 | 12/1961 | Cupery et al. | 117—169 |

ALFRED L. LEAVITT, *Primary Examiner.*

RICHARD D. NEVIUS, A. H. ROSENSTEIN,
                          *Assistant Examiners.*